No. 794,215. PATENTED JULY 11, 1905.
W. S. & C. I. CORBY.
WEIGHING APPARATUS.
APPLICATION FILED APR. 2, 1898.

5 SHEETS—SHEET 1.

No. 794,215. PATENTED JULY 11, 1905.
W. S. & C. I. CORBY.
WEIGHING APPARATUS.
APPLICATION FILED APR. 2, 1898.

5 SHEETS—SHEET 4.

Witnesses
L. C. Hills
George T. May, Jr.

Inventors
William S. Corby and
Charles I. Corby
by J. S. Barker
their Attorney

No. 794,215. PATENTED JULY 11, 1905.
W. S. & C. I. CORBY.
WEIGHING APPARATUS.
APPLICATION FILED APR. 2, 1898.
5 SHEETS—SHEET 5.
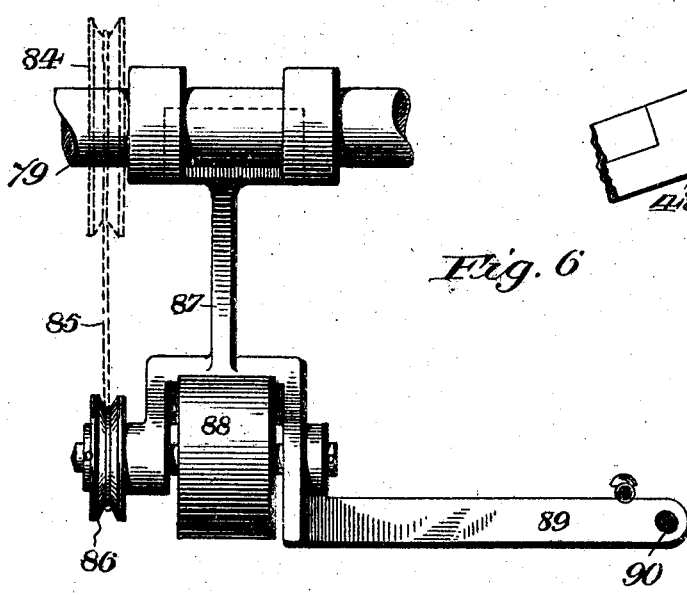
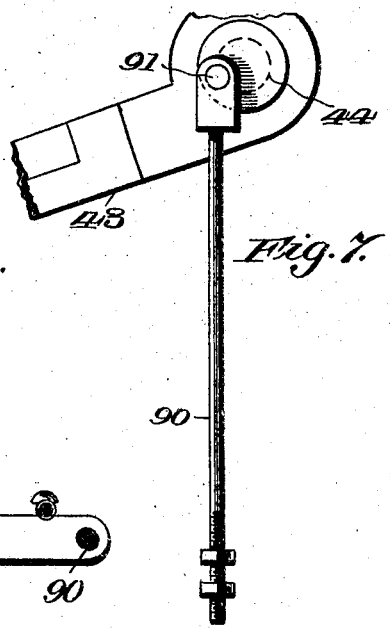
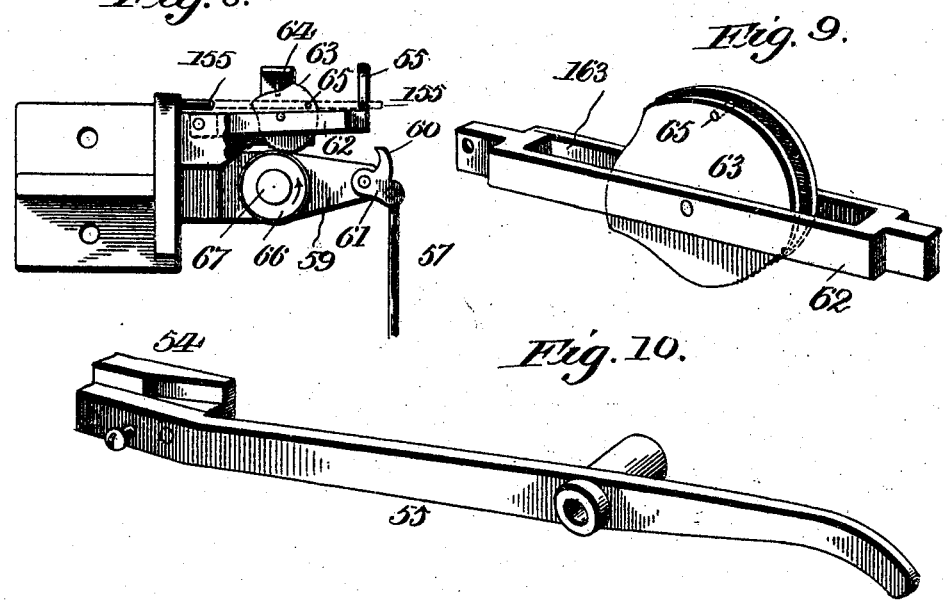
Witnesses
L. C. Hills
George T. May, Jr.
Inventors
William S. Corby and
Charles I. Corby
by J. S. Barker
their Attorney No. 794,215.

Patented July 11, 1905.

UNITED STATES PATENT OFFICE.

WILLIAM S. CORBY AND CHARLES I. CORBY, OF WASHINGTON, DISTRICT OF COLUMBIA.

WEIGHING APPARATUS.

SPECIFICATION forming part of Letters Patent No. 794,215, dated July 11, 1905.

Application filed April 2, 1898. Serial No. 676,234.

*To all whom it may concern:*

Be it known that we, WILLIAM S. CORBY and CHARLES I. CORBY, citizens of the United States, residing at Washington, in the District of Columbia, have invented certain new and useful Improvements in Weighing Apparatus, of which the following is a specification.

Our invention has for its object to produce a machine or apparatus for scaling plastic materials—that is to say, a machine which will operate upon a mass of plastic material of indefinite size and weight and subdivide it into smaller masses of uniform size.

The machine in which we have illustrated our invention as being embodied is particularly adapted for the scaling of dough, whereby the larger mass is weighed and subdivided into masses or loaves of uniform size and weight, and we shall hereinafter in speaking of the material being treated assume that it is dough.

Figure 1:
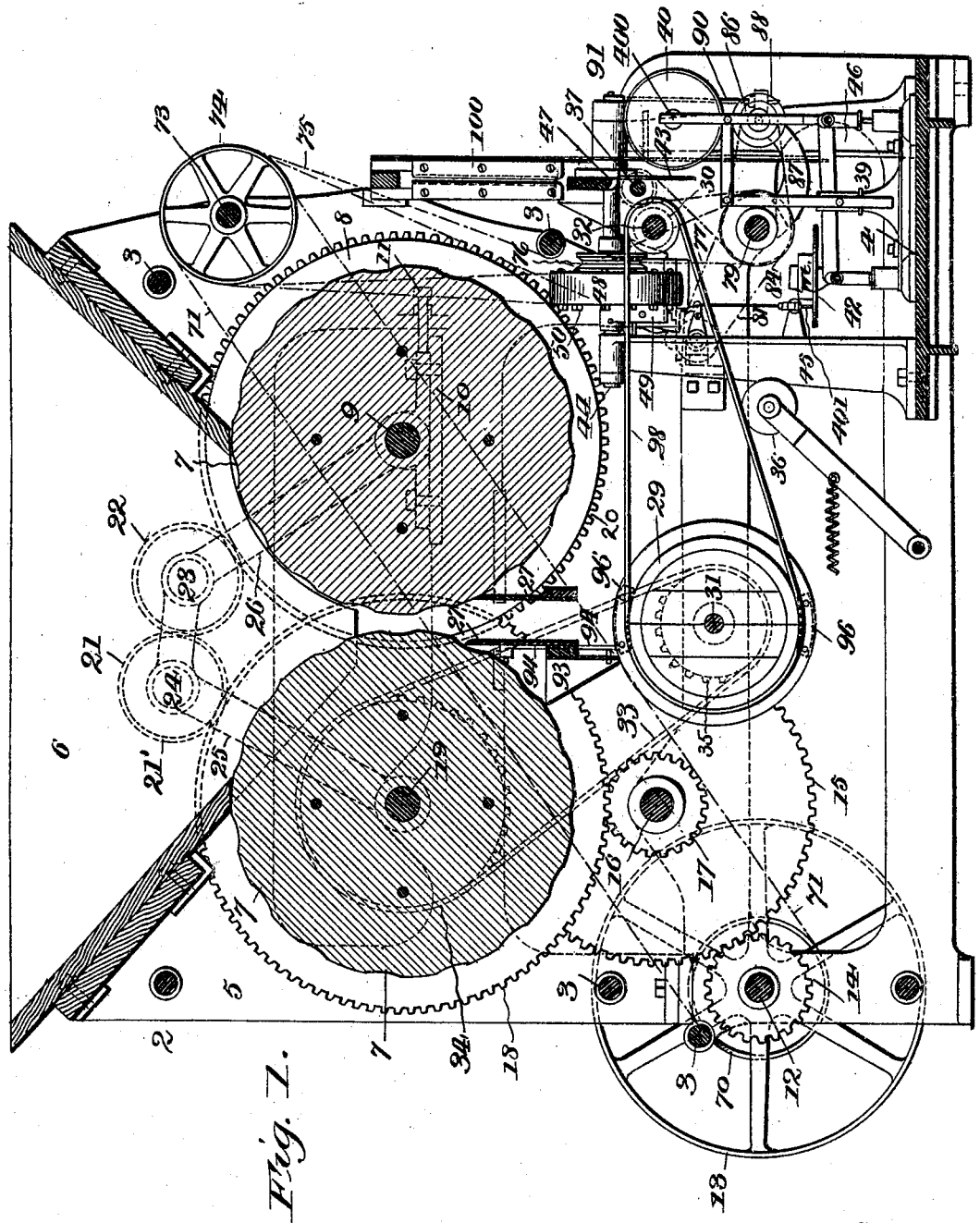
Figure 2:
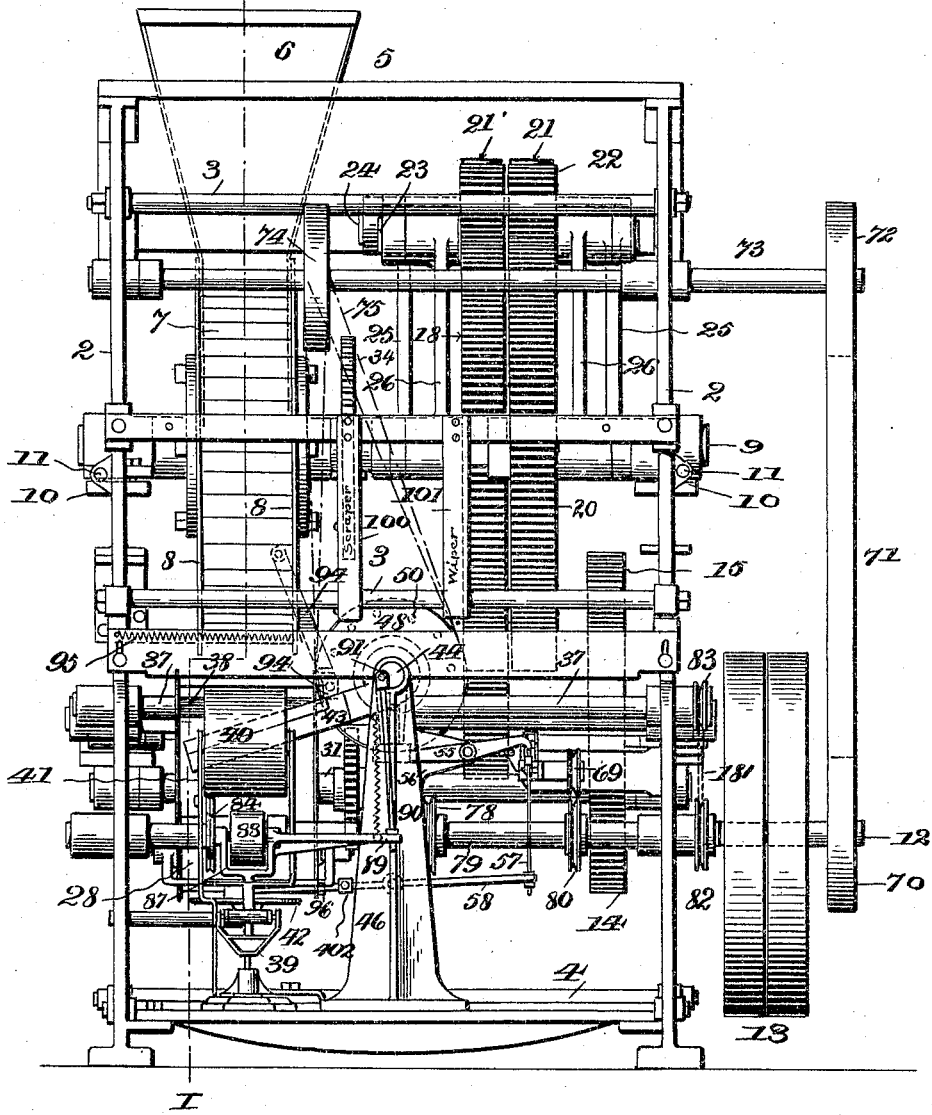
Figure 3:
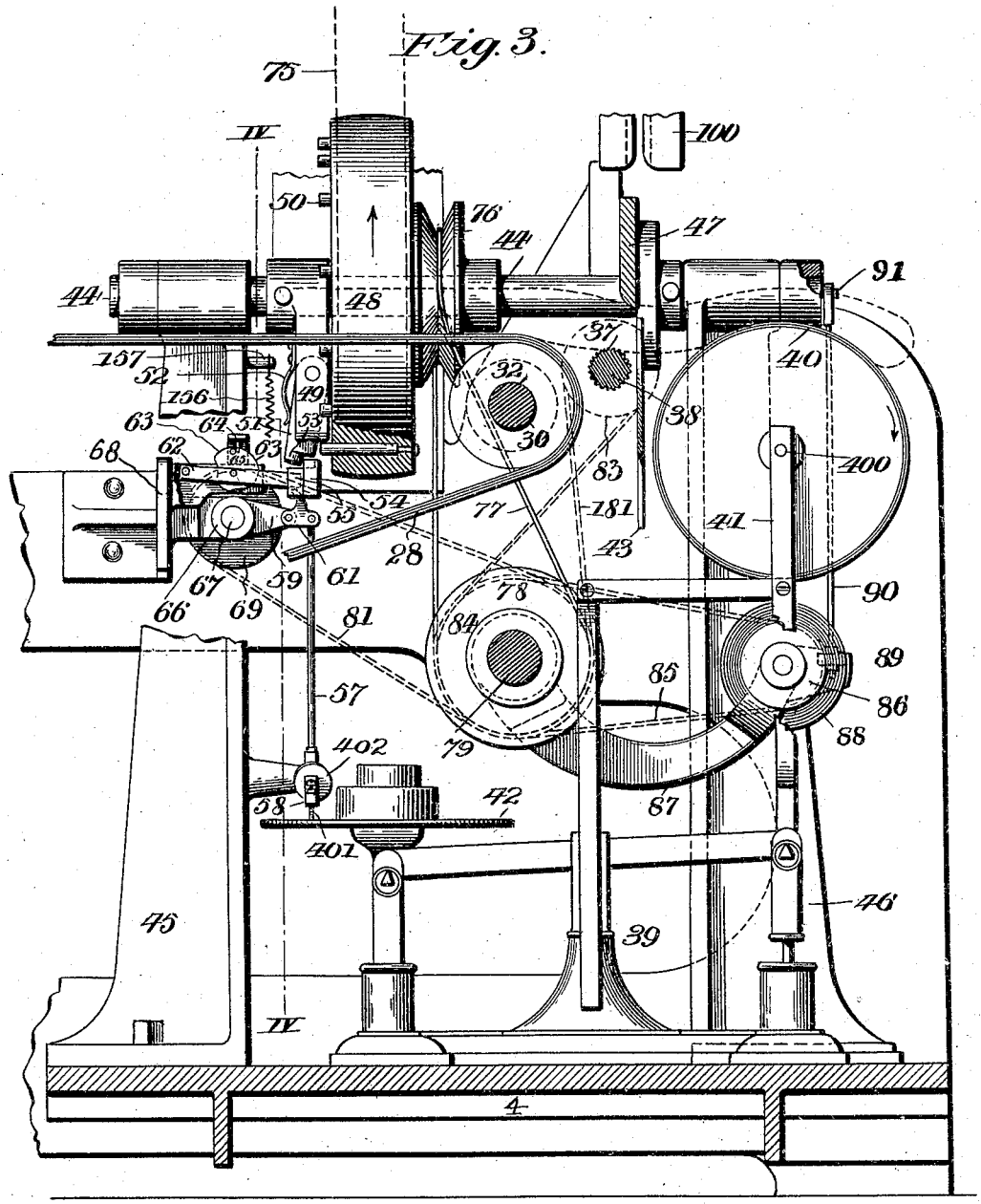
Figure 4:
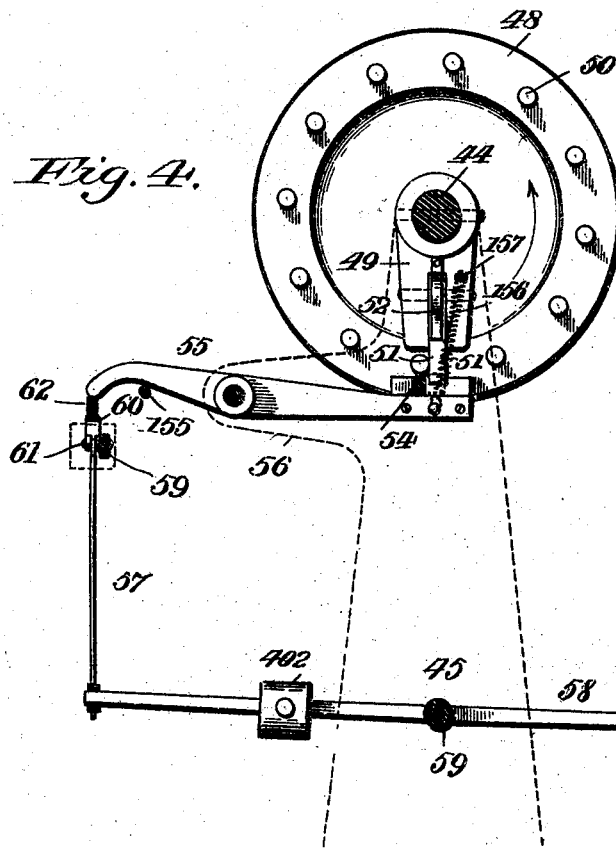
Figure 11:
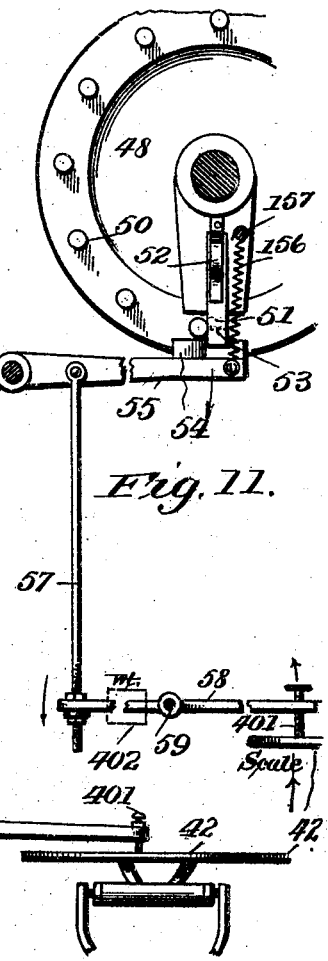
Figure 5:
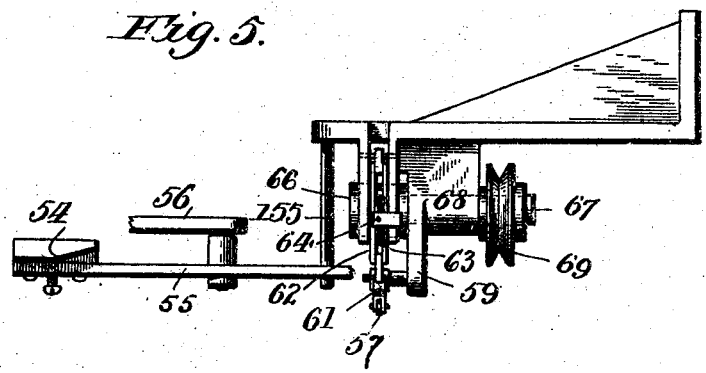

Figure 1 is a longitudinal sectional view taken on the line I I of Fig. 2 of a machine embodying our invention. Fig. 2 is an elevation of the rear or delivery end of the apparatus. Fig. 3 is a longitudinal vertical sectional view, on an enlarged scale, of the rear portion of the apparatus. Fig. 4 is a transverse sectional view taken on the line IV IV of Fig. 3. Fig. 5 is a top plan view, and Fig. 8 an end view, of the positively-driven mechanism for actuating the clutch-shifter. Fig. 6 is a detail plan view of the lifting-frame. Fig. 7 is an elevation of the connecting devices between the lifting-frame and the knife. Fig. 9 is a perspective view of the lever 62 and the eccentric which it carries detached. Fig. 10 is a perspective view of the lever 55 and the cam which it carries detached. Fig. 11 is a transverse sectional view similar to Fig. 4, but illustrating a direct connection between the weighing devices and the clutch-shifter.

In the drawings, 2 designates the main side frame-pieces of the machine, in which the principal parts of the apparatus are mounted. They are united by transverse connecting-rods 3 and support a base-plate 4, upon which the scale mechanism and certain other parts of the apparatus are mounted.

Upon the upper part of the main framework is mounted the feed-hopper frame 5, which is constructed to support a hopper 6, in which is placed the mass of plastic material to be operated upon. The details of construction of the framework may be varied from what is shown in the drawings, as this does not form an important part of our invention.

The bottom or lower part of the hopper is open to permit a pair of large feed-rollers 7 to enter the hopper, so as to engage with the plastic material therein and feed it therefrom in the form of a comparatively thin sheet. To facilitate this feeding, the faces of the rollers are slightly corrugated or roughened. Side flanges 8 bound the edges of the feed-rollers and determine the width of the sheet of material which is fed thereby. These flanges are preferably carried by one of the rollers and extend past the sides of the roller opposite thereto, as clearly indicated in Figs. 1 and 2.

By making the feed-rollers 7 of large size and so mounting them that their working faces extend into and constitute the bottom of the hopper 6 we insure a positive feed of the dough from the hopper at a uniform rate and without necessitating the constant attention of an attendant, it being only necessary to place a large mass of dough in the hopper, after which the entire mass will be uniformly and positively fed therefrom.

In order that the thickness of the sheet formed by the rollers 7 may be varied, one of them is adjustable, to permit which its shaft 9 is mounted in adjustable bearings 10, supported upon the framework 5 and adapted to be held in different positions by the adjusting-screws 11.

We will now describe the preferred form of driving mechanism for operating the rollers 7.

12 designates the main power-shaft of the apparatus, which is provided with fast and loose pulleys 13, which may be belted to a suitable source of power. A gear-pinion 14 on the shaft 12 is arranged to mesh with a gear-wheel 15 on an intermediate shaft 16, on which shaft is also mounted a gear-wheel 17 of smaller size than wheel 15 and meshing with a large gear-wheel 18 on the shaft 19 of one of the feed-rollers. Motion is communicated from the gear-wheel 18 to a wheel 20 on the shaft of the other feed-roller through idler-gearing 21, 21', and 22, mounted in a floating or movable frame supported upon the shafts 19 and 9 of the feed-rollers, so that the adjustment of the bearing 10 and the shaft supported therein does not interfere with the gearing connections between the two feed-rollers.

25 represents angular frame-pieces pivotally supported on the shaft 19 and carrying the shaft 24, upon which are secured the idler-gears 21 21', and 26 represents frames pivotally supported on the feed-roller shaft 9 and connected by the shaft 23 with the angular frame-pieces 25. The shaft 23 carries the idler-gear 22, which meshes with the gear 21.

27 indicates scrapers arranged to bear upon the faces of the feed-rollers and keep them clean.

A traveling conveyer, preferably consisting of an endless belt 28, is arranged adjacent to the open space between the feed-rollers, so as to receive the sheet of material formed thereby and convey it onward for further treatment. This belt is mounted upon rollers 29 and 30, the former, which is much the larger of the two, being mounted on a shaft 31, the latter upon a shaft 32. The belt is driven by a sprocket-chain 33, connecting a sprocket-wheel 34 upon the feed-roller shaft 19 with a sprocket 35 on the shaft of the larger belt-pulley. A belt-tightener 36 keeps the belt under proper tension. The advancing face of the belt is preferably of a length sufficient to receive and sustain a sheet of dough long enough to be formed into several pieces of the size which the apparatus is designed to produce. The advantage incident to having the advancing or working face of the traveling conveyer long as compared with the length of the portions into which the material is divided is that we thereby secure a positive feed of the sheet of material and reduce the danger of the slipping of the conveyer to a minimum.

Just in rear of the belt-pulley 32 and in substantially the plane of the supporting-surface of the belt or preferably a little lower than such plane there is arranged a feed-shaft 37, the portion of such shaft in line with the belt and which receives the sheet of dough as it leaves the belt being preferably roughened, as indicated at 38. Directly beyond or in rear of the feed-shaft is situated the platform of the scales or weighing instrument upon which the dough sheet is fed by the action of the belt and feed-shaft just described.

The weighing device may be of any approved type, the one illustrated being in its main features of a well-known construction and is indicated by 39. It is peculiar, however, in being provided with a platform, table, or receiver for the material to be weighed, which may be made to partake of the movement of the sheet of material that may be delivered thereto. To secure this, we preferably make the scale-platform in the form of a roller 40 of relatively large size and mounted to turn freely in its bearings 400, which are horizontally arranged and situated in the upper part of the vibrating frame 41. This platform is, as already stated, of relatively large size—that is to say, it is of sufficient size to support the desired quantity of material to be weighed upon its upper surface, not requiring the material to be wound around this cylinder again and again in order to accumulate a mass of material sufficient to be weighed, as such supposed arrangement would defeat the purpose of the invention, as it would prevent the material being freely discharged from the platform after being weighed. In order that the platform may be freely movably, so as to advance with and partake of the movement of the material that may be delivered thereto without interfering with the efficiency of the apparatus as a weighing device, we prefer to mount the cylindrical platform upon an axis that is coincident with the axis of the center of gravity of the platform, so that the platform will always be balanced or in a state of equilibrium whatever position it may occupy, the advantages of which arrangement in an apparatus for weighing parts of a moving mass of material of indeterminate weight will be apparent. The opposite weight-carrying platform of the scale is represented at 42.

The parts of the apparatus thus far described constitute a mechanism whereby a piece of dough while yet unsevered from the larger mass upon the advancing belt may be accurately weighed, and if the masses so weighed be severed from the main sheet or mass of material they will be of uniform size and weight. We have invented mechanism for severing the pieces of dough immediately upon their being weighed and will presently describe this part of our invention.

By making the scale-platform in the form of an easily-turning roller very accurate results may be attained, because the forward movement of the material in being forced upon the scale-platform has no practical effect upon the scale as a weighing instrument, the roller turning so freely with the forward movement of the material that the scale mechanism is practically free to act under the influence of the weight alone of the material supported on the platform.

The preferred relative horizontal relation of the upper faces of the conveyer-belt 28, the feeding-roller 38, and the receiving-platform of the weighing device is that indicated in the drawings and well shown in Fig. 3 thereof—that is to say, the upper face of the feeding-roller is a little below the working plane of the conveyer-belt, while the upper face of the receiving-platform of the scale is slightly above such roller when in its elevated position and in about the same plane as the roller when depressed under the influence of the load of material which is delivered thereto. By separating the main conveyer and the receiving-platform of the weighing device some little distance, as represented, and relating the parts as above described we get the best results in the way of accurate weighing.

In combination with the parts already described are a knife or cutter for severing the weighed mass from the main sheet of material, intermittently-operating mechanism for actuating the knife, and connections between the scale mechanism and such knife-actuating mechanism, whereby when the scale is operated under the weight of the material upon its platform the knife is set into operation to sever the weighed piece of material from the main sheet.

43 indicates the knife (shown as being in the form of a rotatable sharpened steel blade) mounted upon a shaft 44. This shaft is arranged transversely relative to the shafts which have already been described—that is to say, in the direction of the length of the machine—and is mounted and rotatable in suitable bearings formed in standards 45 and 46, which are supported upon the base-platform 4 of the framework. The knife is arranged to cut against a shear-plate 47, situated transversely of the machine and so disposed relative to the stationary position of the knife that the dough sheet travels between them, the preferred arrangement being with shear-plate above and the knife below the dough sheet when the knife is at rest. The positions of these parts might be reversed, if found desirable—that is to say, the knife might be arranged above the sheet of dough and the shear-plate below—and the driving connections for the knife might be so arranged as to cause it to rotate in a direction opposite to that indicated by the drawings; but it is thought that these minor changes need not be illustrated.

A clutch device is arranged upon the shaft 44 so that it and the knife may be intermittently connected with a suitable driving part of the apparatus in order that the knife may be caused to make a revolution and sever the piece of dough which has been weighed whenever the scale mechanism operates. This clutch consists of one member loosely mounted upon the shaft and another member secured fast thereto, the loose member being preferably in the form of a belt-pulley 48 and the fast member an arm 49, secured to the shaft 44. Upon the face of the pulley 48 next to the arm there are a series of pins or projections 50, and the arm carries a movable part in the form of a spring-actuated finger 51, which is adapted to be moved into position to engage with such pins and so unite the two parts of the clutch as to cause the shaft and knife to be rotated together or to be disengaged therefrom and allow the shaft and knife to be at rest while the pulley continues to revolve, according as the spring-actuated finger 51 is allowed to engage with the pins 50 or not. The arm 49 is preferably arranged to lie close to the face of the pulley 48 and is of such length as to be inside of the concentric series of pins 50. The finger 51, however, projects beyond the end of the arm and when free to act under the influence of the spring 52 is thereby moved toward the face of the pulley, so that it is in position to engage with the pins 50.

We will next describe the connections between the weighing device and the clutch through which the two members of the latter are caused to engage whenever the former (the weighing device) operates, and we will begin with the end of the connections at the clutch.

54 is a cam with which the end 53 of the movable part or finger 51 of the clutch member 49 is adapted to engage, the inclined face of the cam operating to force the finger out of engagement with the pins of the loose clutch member 48, and thus serving as the clutch-shifter. This cam is preferably carried by a lever 55, which is pivotally supported upon a pin carried by an arm or bracket 56, projecting from the standard 45. There may be a direct connection between the lever and the scale mechanism, as represented in Fig. 11, wherein a link or connecting-rod 57 is shown as uniting the lever 55 with another lever 58, pivoted upon a fulcrum-pin 59 on the standard 45 and having connection with a suitable part of the scale mechanism, as with the weight platform or receptacle 42.

401 represents a screw or adjustably-supported pin mounted in the lever 58 and constituting an adjustable connection between it and the scale-platform 42.

A movable counterbalancing-weight 402 may be mounted upon the lever 58, if found desirable.

It will be seen that whenever the scale-platform 40 is loaded until it becomes depressed and the platform 42 accordingly raised the cam 54 will, through the movements of the connecting parts 58, 57, and 55, be withdrawn from engagement with the movable or spring-finger part 51 of the clutch member 49, with the result that the spring 52 forces the finger into engagement with one of the pins 50 of the revolving-pulley clutch member, thereby connecting the knife-shaft 44 with the driving mechanism and causing the knife to be operated to cut the dough sheet. The shaft and knife are caused to make but a single revolution, as the cam 54 assumes, by means to be later described, a position to intercept the movable finger 51 and disengage it from the clutch-pulley as soon as the shaft has completed a full revolution.

In a construction like that last described, wherein the connection between the scale mechanism and the clutch-operating lever is direct, the amount of power required to operate the lever, overcome friction, and disengage the cam from the end 53 of the spring-clutch finger might be sufficiently great to somewhat impair that delicate operation of the apparatus which is desirable. We have therefore shown combined with the scale mechanism, the clutch, and the means for operating the clutch devices for actuating the clutch-operating means, which devices are in their operation independent of the scale devices or mechanism, though controlled thereby. These devices are best illustrated in Figs. 3, 4, 5, 8, and 9. In this construction the rod 57 instead of being connected directly with the lever 55, which carries the clutch-operating cam, is connected with a pivoted dog or lever 61, supported by a suitable bracket 59 and formed with an end or nose 60, which normally—that is, when the scale is free from a load—rests under and sustains the outer free end of a pivoted arm 62, above which arm is situated that end of the lever 55 which is opposite to the end carrying the cam 54. The arm 62 carries a loosely-mounted eccentric 63, which is preferably mounted in a longitudinally-arranged slot 163. This eccentric is provided with a stop or pin 65, which is adapted to engage with a holding-pin 64, carried by some stationary part of the apparatus, and to be thereby held in an unstable position with the enlarged part of the eccentric above its axis, (see Fig. 3,) so that the moment the engagement between the stop and holding pins 65 and 64 is broken the eccentric turns by gravity upon its axis as it seeks a position of stable equilibrium. The eccentric is situated above a roller 66, with the surface of which it is adapted to engage when the support for the end of the arm 62, which carries it, is withdrawn. (See Fig. 8.) The axis of the pivotal support for the eccentric is parallel with the axis of the roller, so that when they are brought into engagement the eccentric will be turned by the roller, if that be in rotation, and in order to insure a good frictional engagement of these two parts the roller is preferably coated with rubber. The roller is mounted on a short shaft 67, which turns in a stationary bearing 68 and carries a pulley 69 for the belt by which the shaft and roller are rotated. The operation of this part of the apparatus may now be described.

Whenever the platform 40 of the weighing device becomes sufficiently loaded to cause it to be depressed, the rod 57 is moved and withdraws the dog or lever 61 from under the end of the arm 62. This is the only work required to be performed by the scale mechanism in order to set into operation the knife, and the force required to do this is exceedingly small. As soon as the arm 62 is released, it falls until the eccentric rests upon the surface of the revolving roller 66, Fig. 8, and in so falling the eccentric is disengaged from the pin 64, which before held it from rotation, so that it is free to be rotated by the said roller. Owing to the irregular contour of the periphery of the eccentric, its revolution operates to cause a vibration of the outer end of the arm 62, the first movement imparted to the arm after the eccentric engages with the roller being a lifting thereof. The lifting of the arm 62 causes it to engage with and operate the lever 55, which, as has been explained, is one element in the combination of parts which operate the clutch through which the knife is connected with the driving mechanism. Before the eccentric completes its revolution the dog or lever 61 is returned to its normal position, so that as the arm falls, owing to the lower part of the eccentric being on the face of the roller, it comes to rest upon the dog, and the eccentric is stopped by the pin 64. It will be understood that the eccentric is not only of irregular contour, but that it is also so weighted relative to its pivotal support that after the end of the lever 62 comes into engagement with the stop-dog 61 the eccentric continues to move for a short distance under the influence of gravity and until the pins 65 and 64 engage, and in making this final movement the lowest part of the eccentric is brought opposite the roller, so that there is ample space for the free movement of the latter without touching the eccentric.

The knife-blade 43 in making its revolution or cutting movement and immediately after it has severed the dough sheet passes between a pair of scrapers 100, which operate to clean the knife and remove any particles of dough which might have stuck thereto.

101 indicates a pair of wipers or greasing-pads, between which the knife is passed after leaving the scrapers 100, and by which it is greased.

Either the scrapers or the greasing-pads, or both, might be omitted if under any circumstances they are found to be unnecessary.

We will now describe the driving connections by which the knife and the roller 66 are operated.

70 represents a pulley upon the main driving-shaft 12 of the apparatus, and connected by a belt 71 with a pulley 72 on a shaft 73. On this shaft there is another pulley 74, which is connected by a belt 75 with the pulley 48, which constitutes the loose member of the clutch device on the knife-shaft 44.

76 is a belt-pulley mounted loosely on the knife-shaft and connected with the clutch-pulley 48. The two pulleys 48 and 76 are preferably integral. A belt 77 connects the pulley 76 with a pulley 78 on a shaft 79, arranged below and at right angles to the knife-shaft 44. The shaft 67 and the eccentric-operating roller 66 thereon are driven from a pulley 80, Fig. 2, on the shaft 79, which is connected by a belt 81 with the pulley 69 on the shaft 68.

The feeding-shaft 37, which is arranged between the feeding-belt and the scale-platform, is preferably positively driven. 83 represents a pulley on such feed-shaft connected by a belt 181 with a pulley 82 on the shaft 79.

It will be seen by reference to Fig. 2 that the shaft 79 carries four belt-pulleys, which we will now refer to in order, beginning at the right-hand end of the shaft as seen in Fig. 2—viz., pulley 82, which operates as a driver for the feeding-shaft 37; pulley 80, which operates as the driver for the short shaft 67, that carries the roller for positively operating the clutch-shifter; pulley 78, which is the driving-pulley for the shaft 79, receiving a belt from the pulley 76 on the knife-shaft, and pulley 84, which drives the roller in the lifting-frame now to be described.

We have invented and in the drawings illustrated means for imparting to the scale roller or platform 40 a positive movement or rotation to discharge therefrom the portion of dough which has been weighed and severed from the mass and also means for positively and quickly restoring the scale-platform to position to receive another portion of the dough to be weighed, and we will next describe the mechanism for effecting these results.

87 indicates a swinging frame mounted loosely upon the shaft 79 and supporting in its free or outer end a contact or friction roller 88. The frame is so shaped and disposed that the roller 88 is directly below the scale-platform roller 40 and in position to be engaged and rotated thereby when the scale-roller is depressed. The contact-roller is constantly rotated, its shaft being provided with a pulley 86, which is connected by a belt 85 with a pulley 84 on the shaft 79. The rotation which will be imparted to the roller 40 upon coming into engagement with the revolving roller 88 will cause the piece of dough which may rest thereon to be discharged or thrown off, and it will be observed that the direction of the movement of the material in being thus discharged is away from the feeding-belt and substantially the same as that which it had when being advanced to and upon the platform.

The frame 87 is provided with an extension or arm 89, which is connected by a rod 90 with an eccentric-pin 91 at the end of the knife-shaft. The relative angular positions, Figs. 2 and 7, of the pin 91 and the knife are such that the frame and the roller 88, carried thereby, are lifted immediately after the knife has severed the sheet of dough, with the result that the scale mechanism is positively and quickly restored to its normal position with the platform ready to receive the advancing sheet of dough. At the same time the dog 61 is restored to its position to catch and hold up the lever 62, as has been described, by reason of its connection with the scale-platform 42.

A flour-box 93 is arranged above the feeding-belt 28 and is so constructed that flour may be dusted therefrom upon the face of the belt to prevent the dough sheet sticking thereto. We prefer to combine with the flour-box means for jarring it to dust the flour on the belt, and 94 represents a hammer arranged to intermittently strike and jar the box. The hammer may be acted upon in one direction by a spring 95 and in the opposite direction by cams 96, carried by the belt-roller 29.

The rotary cylindrical-shaped platform 40 may be termed a "load-receiver," as it receives the load or mass to be weighed, and the mechanism that delivers the plastic material to such platform or load-receiver may be termed the "load-supplying" means, because such means deliver or supply the load to the platform, or they may be termed a "force-feeder," as such means feed the material with sufficient force to accomplish delivery to the platform or load-receiver. Likewise the knife which severs the weighed mass from the larger body being supplied or delivered to the platform may be termed a "cut-off" device, as it serves to cut off or sever the weighed mass from the main body of the material.

What we claim is—

1. The combination of means for supporting a mass of material while being advanced, and a weighing device having a vertically-reciprocatory load-receiver adapted to receive such material as it moves from the supporting means, and free to move forward with the same as it is being fed thereto substantially as set forth.

2. The combination of means for feeding a mass of plastic material, a weighing device having a vertically-reciprocatory load-receiver arranged to receive the material, which is freely movable in a forward direction, the load-receiver being moved forward at the time the material is being fed thereon, and means for severing the portion of the mass which has been weighed from the main mass of material, substantially as set forth.

3. The combination of means for continuously feeding a mass of material, a weighing device for the material having a load-receiver upon which the material passes and arranged to move with the material as it is fed thereupon, and means for severing the weighed portion of the material from the mass without stopping the feeding means, substantially as set forth.

4. The combination of means for forming and for advancing an elongated mass of plastic material of indeterminate weight, a scale having a load-receiver arranged in the path of such advancing mass to receive and support the portion thereof to be weighed, such load-receiver being freely movable so that it will advance with the mass of material being delivered to it without interfering with its efficiency as a weighing device, substantially as set forth.

5. The combination of means for advancing a mass of plastic material, and a weighing device having a vertically-reciprocatory load-receiver adjacent to said advancing means and situated in the path of the material advanced thereby, and mounted upon an axis on which it is free to turn, whereby it is adapted to partake of the forward movement of the material, substantially as set forth.

6. The combination of means for advancing a mass of plastic material and a weighing-scale independent of such advancing means and having a load-receiver upon which the said advancing means normally delivers the material, the said load-receiver being free to move in a forward direction with the material when it is delivered thereto, and also so mounted as to be free to be depressed by the weight of the material thereon while so moving forward, substantially as set forth.

7. The combination of means for forming a mass of plastic material into a sheet, an endless conveyer that receives and advances the sheeted material, a weighing-scale having a vertical reciprocatory load-receiver to which the material is delivered by the conveyer, such load-receiver being free to move forward with the material as it is fed thereto, and being arranged in substantially the same horizontal plane as is the delivery end of the conveyer, and means for severing the portion of the material that is weighed from the mass, substantially as set forth.

8. The combination of means for sheeting plastic material, a continuously-moving conveyer which receives and advances the sheeted material, a weighing device to which the material is delivered, means for severing the weighed portion of material from the mass, and means controlled by the weighing device for imparting intermittent movements to the severing means, substantially as set forth.

9. The combination of means for sheeting a mass of plastic material, an endless-belt conveyer to which the sheeted material is delivered, a weighing device having a load-receiver adjacent to the delivery end of such belt, a knife for severing the material arranged between the delivery end of the belt and the load-receiver of the weighing device, and an intermediate support for the material also arranged between the end of the belt and the weighing device, substantially as set forth.

10. The combination of a substantially horizontal moving conveyer adapted to advance a mass of plastic material, and a weighing device for the material having a load-receiver consisting of a roller mounted on a horizontal axis on which it is free to turn, the upper part of the roller being in substantially the same plane as is the conveyer and adjacent to the delivery end thereof, substantially as set forth.

11. In a device for weighing and subdividing plastic material while in the mass, the combination of means for advancing the material, a weighing device having a load-receiver upon which the advanced material is delivered, means for severing the portion of material upon the load-receiver from the mass after it has been weighed, and means for continuing the movement of the severed portion of material while still remaining on the load-receiver on substantially the same direction as that it had when being advanced to and upon the load-receiver, substantially as set forth.

12. The combination of means for advancing a body of plastic material in mass, a weighing device having a load-receiver situated in the path of the material, and movable to discharge the weighed material, and also to partake of the movement of the material being advanced thereto, means for severing the weighed portion of material from the main mass, and means for moving the load-receiver to discharge the portion of material thereon after the weighing and severing operations have been effected, substantially as set forth.

13. The combination of a weighing device having a cylindrical load-receiver which is free to turn upon its axis, and when free of its load is supported in a state of equilibrium upon said axis whatever be its position and driving means for imparting rotation to the load-receiver to effect the discharge of the weighed material thereon, the said means being arranged substantially as described, whereby they operate to effect the rotation of the load-receiver when the latter is depressed by the material being weighed, and are inoperative when the load-receiver is raised, substantially as set forth.

14. The combination of a weighing device having a relatively large load-receiver of roller or cylindrical form which is free to turn on its axis, and on the surface of which the material to be weighed is delivered and a driven roller with which the said load-receiver engages when depressed under the load of the material being weighed, substantially as set forth.

15. In an apparatus for weighing plastic material in the mass the combination of a weighing-scale, means for advancing the material to the weighing-scale, a revoluble cutter for severing the weighed portion of the material from the mass arranged transverse to the path of movement of the mass of material, and mounted on a revoluble shaft which is parallel with the direction of the path of movement of the material, and means for intermittently imparting a revolution to the shaft whereby the cutter is revolved to effect the severing of the material, substantially as set forth.

16. In an apparatus for weighing plastic material in the mass, the combination of a weighing device, means for severing the weighed material from the mass, comprising a revoluble knife and a shear-plate which together effect the cutting operation, the normal positions of these parts being on opposite sides of the material, means for moving the knife into coöperative relation with the shear-plate and means for feeding the mass of plastic material to the weighing device and supporting it adjacent to the severing devices, substantially as set forth.

17. The combination of means for advancing a mass of plastic material, a revoluble knife for severing the material, a scraper arranged in the path of movement of the knife, and a wiper with which the knife engages after being scraped, substantially as set forth.

18. In a weighing device the combination of means arranged to constantly feed a mass of material, the load-receiver upon which the material to be weighed is placed, arranged to move up and down, means independent of the weighing device proper for positively lifting the load-receiver immediately after the weighing operation has been effected whereby the load-receiver is quickly restored to a position to receive the material that is being constantly fed to the weighing device, substantially as set forth.

19. In a weighing device, the combination with the load-receiver arranged to move down under the influence of the load upon the load-receiver, and upward when that is removed, of means for positively discharging the weighed material after the weighing operation has been effected, and means independent of the weighing device proper for positively lifting the load-receiver after the weighing operation and the discharge of the weighed material has been effected, substantially as set forth.

20. In a weighing device the combination of means for continuously feeding the material to be weighed, the load-receiver upon which the material to be weighed is received, arranged to move up and down, means for positively lifting the load-receiver after the weighing operation has been effected, and rapidly-operating devices arranged to positively move the said lifting means to quickly effect the movement of the load-receiver in the position to receive the material from the continuously-operating feeding means, substantially as set forth.

21. In an apparatus for weighing material in the mass, the combination of a weighing device having a load-receiver to receive the material to be weighed, which is movable up and down, a knife for severing the weighed portion of material from the mass, means for discharging the severed portion of material from the load-receiver after the weighing and severing operations have been effected, and means independent of the weighing device for positively restoring the load-receiver to its upper position after the weighing operation has been completed, substantially as set forth.

22. In an apparatus for weighing material in the mass, the combination of a weighing device having a load-receiver which is movable up and down, a knife for severing the weighed portion of material from the mass, and means operatively connected with the knife for restoring the load-receiver to its upper position after the knife has completed its work, substantially as set forth.

23. In an apparatus for weighing material in the mass, the combination of a weighing device having a load-receiver to receive the material to be weighed, which is movable up and down, a knife for severing the weighed portion of the material from the mass, a revoluble shaft on which the knife is mounted, a movable frame or part adapted to engage with the weighing device and to restore the load-receiver to its upper position by a positive action, and a reciprocating connecting-rod between the knife-shaft and the said movable frame or part for lifting the load-receiver, substantially as set forth.

24. In an apparatus for weighing material in the mass, the combination of a weighing device having a load-receiver movable up and down and in the form of a roller which is free to turn upon its axis, a knife for severing the material, a movable frame 87, a driven roller 88 mounted in such frame, with which the said roller load-receiver engages when depressed, and means for lifting the said frame and roller 88 whereby it operates to move the said load-receiver to its upper or raised position, substantially as set forth.

25. The combination of the knife, the revoluble shaft to which it is secured and the clutch mechanism for intermittently connecting the said shaft with the driving mechanism, and comprising a belt-pulley 48 loose on the shaft and provided with a series of pins or projections 50, an arm 49 secured to the shaft and arranged close to the face of the pulley 48 and provided with a spring-actuated finger 51 which is adapted to engage with the pins 50 when free to act under the influence of the spring, and a shifter for actuating the spring-finger 51, substantially as set forth.

26. The combination of the weighing devices, the knife, the driving mechanism for the knife, a clutch connecting the driving mechanism and the knife, a shifting device for operating the clutch, positively-driven means for moving the clutch-shifter, and a means operated by the weighing devices for bringing into operation the said positively-driven means, substantially as set forth.

27. The combination of the weighing devices, the knife, the driving mechanism for the knife, a clutch connecting the driving mechanism and the knife, a shifting device for operating the clutch, a lever 55 carrying such shifter, an arm 62 adapted to move the lever 55, an eccentric 63 mounted on such arm, a driven roller 66 with which the said eccentric is adapted to engage and by which it is rotated, in order to effect a movement of the arm 62, and means operated by the weighing devices for holding the arm 62 with the eccentric out of engagement with the roller, substantially as set forth.

28. The combination of a weighing device having a vertically-movable load-receiver upon which the material to be weighed is fed, the load-receiver being also free to move forward with the material as it is fed thereto, and other operating means for moving the load-receiver forward arranged to operate after the weighing has taken place, substantially as set forth.

29. The combination of a weighing device having a vertically-movable load-receiver upon which the material to be weighed is fed, the load-receiver being mounted so as to be free to move forward with the material as it is fed thereto, means for feeding the material to the load-receiver, and means for positively moving the load-receiver in a forward direction after the weighing has been effected to effect a discharge of the material, substantially as set forth.

30. In an automatic weighing-machine, the combination with load-supplying means, of a scale-beam, a load-receiver, carried by the scale-beam and being rotatable during the delivery of the load thereto, and a cut-off device controlled by said scale-beam.

31. In an automatic weighing-machine, the combination with plastic-supplying means embodying a force-feeder, of a scale-beam, a load-receiver carried by the scale-beam and immediately adjacent to the delivery end of the plastic-supplying means and rotatable during the delivery of the plastic thereto, and a cut-off device controlled by said scale-beam.

32. In an automatic weighing-machine, the combination with load-supplying means, of a scale-beam, a load-receiver carried by said scale-beam and freely rotatable in a substantially vertical plane during the delivery of the load thereto, and a cut-off device controlled by said scale-beam.

WILLIAM S. CORBY.
CHARLES I. CORBY.

Witnesses:
GEORGE T. MAY, Jr.,
J. S. BARKER.